3,323,888
METHOD FOR MANUFACTURING GLASS BEADS

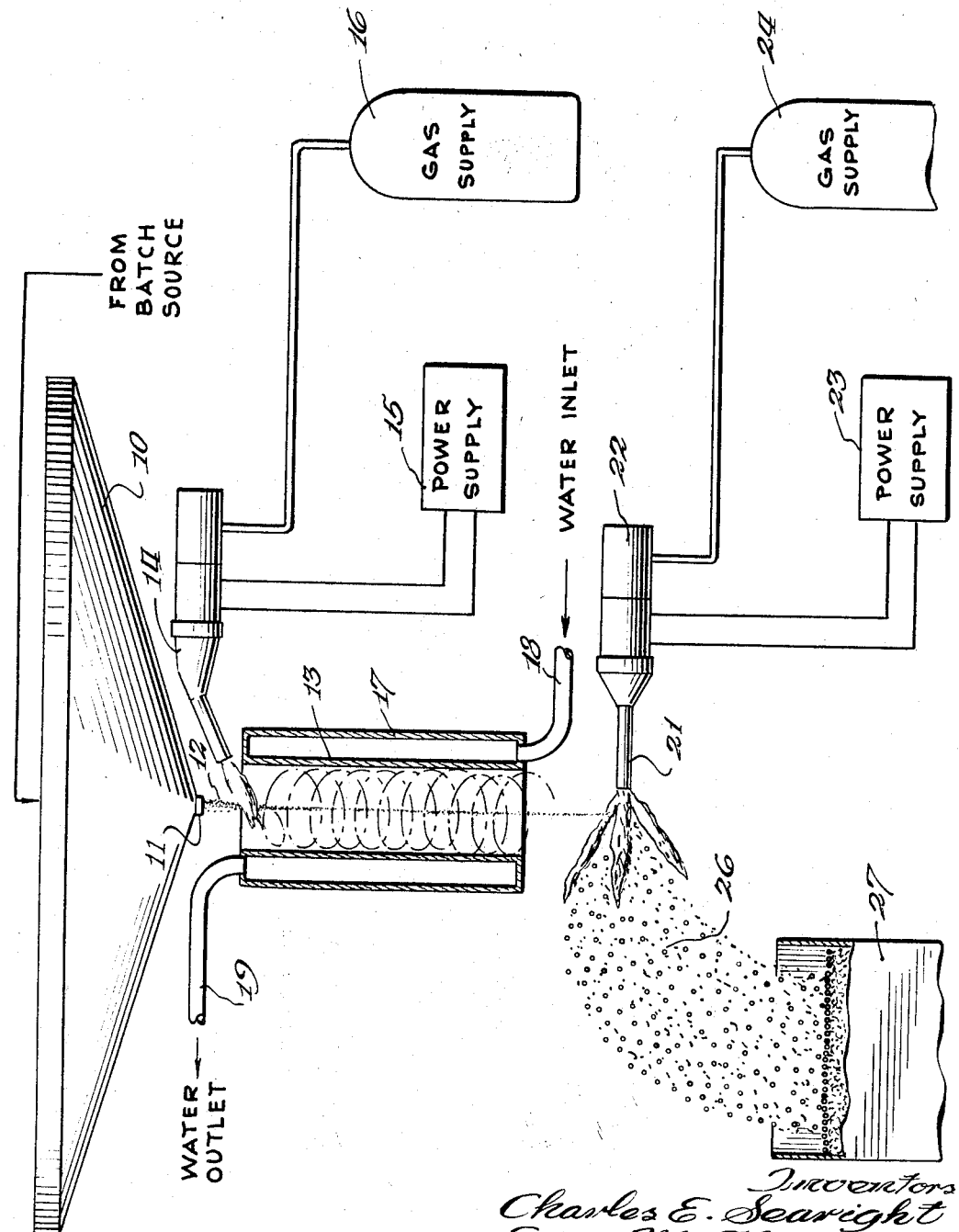

Charles E. Searight, Ezra M. Alexander, and John R. Ryan, Jackson, Miss., assignors to Cataphote Corporation, Jackson, Miss., a corporation of Ohio
Filed Mar. 17, 1964, Ser. No. 352,552
8 Claims. (Cl. 65—21)

This invention relates to a new and improved method for manufacturing glass beads and, more particularly, to such a method in which a plasma flame jet is used to subdivide the molten glass stock into the desired small particles.

In a currently used method for producing glass beads or spheres having diameters less than about ¼ inch, molten glass stock is subdivided ("spheroidized") by means of a gas such as air which is blown with sufficient velocity against a molten stream of glass of suitably low viscosity to cause the subdivision of the molten glass into small particles, which on cooling become the desired glass beads. The method as heretofore known suffers from a number of deficiencies, among which are high furnace maintenance costs, low efficiency in producing usable spheroids, and inability to use many of the desirable glass compositions now available. The principal difficulty stems from the fact that, in order to produce glass beads by this method, the viscosity of the molten glass must be sufficiently low to permit subdivision by means of the gas blast which itself has a cooling effect. This, in turn, requires that the molten glass must be at a temperature ranging from about 2100° F. to substantially over 3000° F. Although some glass compositions can be readily spheroidized at relatively low temperatures within the above range, i.e., about 2100° F. to 2800° F., these glasses are, in general, much more corrosive than the more viscous glasses which must be heated to a higher temperature in order to achieve comparable degrees of fluidity. Accordingly, although glass beads can readily be produced from these low melting glasses, their high corrosivity adversely affects the life of the furnace used to heat and melt the glass and thereby significantly increases the cost of operation.

The known glasses which are sufficiently fluid at relatively low temperatures for glass bead formation are, moreover, only a minority of known glass compositions, most of which are too viscous for efficient glass bead formation by known methods even at temperatures exceeding 3000° F. These relatively viscous glasses include those which are relatively non-corrosive to furnace refractories and, in addition, those which possess desirable physical properties such as increased hardness, impact resistance, strength, and high resistance to chemical attack.

In accordance with the present invention, there is provided a method for readily producing the high temperatures necessary to spheroidize the glass compositions which have been used only with difficulty, if at all, in the past. This method involves the use of a stream of hot plasma (i.e., a plasma "jet") moving at a relatively high speed which impinges on a stream of molten glass, subdividing it into the desired particles. The plasma stream is at an elevated temperature ranging to 30,000° F. or even higher, if necessary, so that the requisite temperature for efficient spheroidization is readily achieved without the cooling effect of the blast of air which has created difficulty in the methods heretofore known and used.

The invention is further characterized in that the molten glass stream is produced during the course of the process by heating a stream composed of the solid raw glass batch, i.e., the solid ingredients which when melted together form glass, such as silicon dioxide, calcium carbonate, sodium carbonate and other ingredients used to modify the glass compositions. The raw batch ingredients, either dry or preferably in the form of a slurry in a suitable liquid such as water, are allowed to fall under the influence of gravity through a generally vertical heated tube. The batch, as it exits from the heated tube, must be softened sufficiently and, preferably, at least partially fused so that a suitable atomizing plasma flame jet positioned essentially at right angles to the falling batch-glass stream can atomize it into glass beads.

The flame jet used in the invention comprises "plasma," i.e., material which is an energy state above that which exists in the gaseous state, being further characterized in that at least some of the atoms of material have been depleted of some of the electrons which they normally possess in the free state. Although the invention utilizes a plasma flame, it should be understood that the method or means used to generate such a flame does not per se constitute part of the invention. Suitable devices for producing the plasma flame jet needed in the invention are known to those skilled in the art. As an example, U.S. Patent No. 2,960,594, which issued on Nov. 15, 1960, to M. L. Thorpe, describes both the theoretical and practical aspects of suitable plasma flame generators. Equipment satisfactory for use in the present invention is commercially available.

The method of the invention will be better understood from the following detailed description thereof, taken in conjunction with the accompanying drawing which depicts schematically a typical embodiment of the apparatus which can be used in carrying out the method of the invention.

The apparatus depicted in the drawing comprises batch reservoir 10 in which the raw batch stock, either dry or as a slurry, is stored. Port 11 communicates with reservoir 10 and defines a stream 12 of batch ingredients which issues from the furnace under the influence of gravity.

As the stream 12 of dry batch ingredients falls, it enters the entrance of a generally vertical, water-jacketed tube or cylinder 13. This tube is heated in any suitable manner to a temperature sufficiently high such that the solid batch ingredients are softened and at least partially fused before they exit at the other end of the tube. A suitable method of accomplishing this heating is shown in the drawing, which depicts a plasma jet generator 14 which injects its heating flame tangentially into the entrance of tube 13. The plasma flame creates a vortex along the length of tube 13 through which the batch ingredients fall without substantial contact with the walls of the tube. Plasma jet generator 14 is provided with a conventional electrical power supply 15 and gas supply 16 in a manner which will be apparent to those skilled in the art. This heating system can be used to produce practically any desired temperature in the stream of batch ingredients falling through tube 13. In order to prevent damage to the tube itself from the extremely high temperatures, which may reach 50,000° F. or higher, tube 13 is provided with a cooling jacket 17 equipped with inlet conduit 18 and outlet conduit 19 through which cooling water is circulated as required.

Provided that tube 13 through which the raw batch falls is heated to a suitably high temperature and the length of the tube 13 is sufficient, the raw batch passing therethrough can be easily transformed into molten fluid glass at the time it exits from the tube.

In addition to the plasma flame heater 14 depicted, other auxiliary heating systems can be used to fuse the raw batch, including systems burning fuels such as hydrocarbons or those using electrical heating means, as will be apparent to those skilled in the art.

As the stream 12 of glass, having passed through tube 13 and now softened and at least partially fused, continues its fall, it passes transversely across the orifice 21 of a second plasma jet generator 22 which is provided with conventional electrical power supply 23 and gas supply 24.

Under the influence of the plasma jet emerging from generator 22, the stream 12 of molten glass is further heated and spheroidized into particles 26 of molten glass which cool during their free fall to a suitable container 27 where they are collected. The distance through which the subdivided particles of hot molten glass are allowed to fall should be sufficient to permit these particles to become solid before striking any object which might tend to distort them. Alternatively, a stream of cooling air, not shown, can be caused to pass through the falling particles in order to hasten the solidification.

Because of the generally poor heat transfer characteristics of glass, the glass must be preheated to a molten condition in tube 13 before being contacted by the plasma jet 22. Rather than melting and spheroidizing smoothly, solid glass stock in contact with the extremely hot plasma flame tends to vaporize on the surface nearest the flame, while remaining solid on the opposite surface. We have found that a suitable glass preheating temperature range is from about 1800° F. to about 3500° F., the lower limit usually being sufficient to insure adequate mobility of the glass so that it can be quickly heated in its entirety.

The temperature to which the molten glass must be heated before impingement of the plasma jet from generator 22 depends on the nature of the glass and usually ranges between 1800° F. and 3500° F. in most cases. The required temperature of the plasma flame itself also depends to a great extent on the nature of the glass being processed and typically ranges from about 3500° F. to about 12,500° F., which upper limit is usually sufficient to spheroidize most glasses into glass beads. If necessary, however, the upper limit can readily be increased to temperatures on the order of 30,000° F. or even higher by suitable selection of the gas used in the plasma generator and the addition of sufficient electrical energy to achieve this temperature, as will be apparent to those skilled in the art.

In addition to the temperature of the plasma flame, the efficiency of spheroidization depends also to an extent on the velocity with which the plasma issues from the orifice of the generator. We have found that velocities ranging from somewhat below Mach 1, e.g., Mach 0.75, to above Mach 2 will generally be sufficient although, again, this variable can readily be controlled as desired.

Although the stream 12 of glass forming ingredients may be dry, we prefer to use a slurry of these ingredients in a suitable liquid which will tend to maintain the stream in a more cohesive form as it falls through tube 13. In use in slurry form, the raw batch materials should be, preferably but not necessarily, of about the same particle size distribution. The particles are suitably less than 100 mesh and preferably less than 200 mesh when water is used to form the slurry. In addition to water, any suitable liquid organic material can be used which will serve to bind loosely the raw batch ingredients together and which is easily destroyed by the high temperature of the heated tube 13.

Glass stream 12 may have any diameter consistent with the ability of the plasma flame generator 22 to subdivide it. The size of the orifice of the plasma generator depends, in turn, on a number of practical factors such as the diameter of the glass stream, and the flow rate thereof. As a practical matter, diameters within the range from about 0.25 inch to about 1.5 inch will usually be found to be satisfactory although larger diameters can also be used. The range of diameters is, to a large extent, economic in nature. The greater the flow of glass being atomized by the plasma flame generator, the greater the rise in temperature in the area of atomization and bead collection, which results in a reduction in the cooling rate of the beads before collection. It is apparent that the glass beads must be cooled enough to set so that they will not be deformed when they eventually land in the collector. By permitting the particles a greater fall in the air, or by passing large volumes of cooled air through the zone, the production rate can be increased.

In general, it is not absolutely necessary to have continuity in the raw batch stream as it falls through the heated tube. Excessive turbulence should, of course, be avoided in order to prevent blowing the raw batch ingredients in an erratic manner through the tube. When a high velocity plasma jet is used to heat the tube, as previously explained, a vortex can be formed through which the raw batch can be fed satisfactorily through the tube without excessive turbulence.

Although in the figure the heated tube 13 has been shown in a vertical position which, in general, is the preferred position, this arrangement is not essential for operation of the invention, since other arrangements can also be used. For example, heated tube 12 might be held in a position slightly declined from horizontal, through which the raw batch passes and is contacted at the exit end by a plasma jet placed beneath the tube which atomizes the glass stream in an upward direction as it leaves. Various other arrangements in which the heated tube may vary between vertical and almost horizontal will also be apparent to those skilled in the art.

The gases which are suitable for use in the plasma generator in accordance with the invention are generally the inert gases such as nitrogen, argon, and helium or various mixtures thereof. The choice of gas is outside the scope of this invention and a suitable selection will be apparent to one skilled in the art.

By means of the method of the invention, it is possible to form glass beads with high rates of efficiency from relatively viscous glasses which could be used, if at all, only with difficulty heretofore. In addition, glasses having particularly desirable characteristics, such as increased hardness, impact resistance, and strength, can also be readily formed into beads without difficulty. The invention thus makes available beads made of glasses having desirable characteristics which have not been heretofore available because of the difficulty in spheroidizing these glasses. In addition, the invention avoids the difficulties encountered in the past arising from contamination of the molten glass by the refractories in the furnaces used to prepare the molten batch.

The foregoing detailed description has been given for clearness of understanding only, and no unnecessary limitations should be understood therefrom, as modifications will be obvious to those skilled in the art.

What is claimed is:

1. A method of manufacturing glass beads which comprises formulating a batch of glass-forming ingredients; creating a vortex within an elongated, generally-vertical tube by injecting a plasma flame jet tangentially thereinto; heating said batch by passing it as a stream through said vertical tube; further heating and atomizing said stream by impinging a hot plasma gas thereon, said plasma gas having a velocity sufficient to subdivide said stream into particles of molten glass; and cooling said molten particles to a solid condition.

2. The method of claim 1 in which said batch of glass-forming ingredients is in solid particulate form as it enters said tube.

3. The method of claim 1 wherein said batch is molten as it enters said tube.

4. The method of claim 1 in which said batch of glass-forming ingredients is in aqueous slurry form as it enters said tube.

5. A method of manufacturing glass beads which comprises creating a vortex within an elongated, generally-vertical tube by injecting a plasma flame jet tangentially into the upper end of said tube, allowing a stream of glass-forming ingredients to fall under the influence of gravity through the vortex in said tube, the temperature within said tube and the time of fall of said stream therethrough being coordinated so that said stream is in a molten, spheroidizable condition as it exits from said tube; spheroidizing said stream into particles of molten glass; and cooling said molten particles to a solid condition.

6. The method of claim 5 in which the glass-forming ingredients in said stream are solid particles as they enter said tube.

7. The method of claim 5 in which said stream is molten as it enters said tube.

8. The method of claim 5 in which said stream is an aqueous slurry as it enters said tube.

References Cited

UNITED STATES PATENTS

| | | | |
|---|---|---|---|
| 848,422 | 3/1907 | Wynne | 219—50 |
| 2,794,301 | 6/1957 | Law et al. | 65—21 |
| 2,960,594 | 11/1960 | Thorpe | 219—75 |
| 2,972,169 | 2/1961 | Stalego | 65—21 |
| 3,133,805 | 5/1964 | Robinson | 65—21 |
| 3,150,947 | 9/1964 | Bland | 65—21 |
| 3,171,714 | 3/1965 | Jones et al. | |

OTHER REFERENCES

Browning: "Plasma—A Substitute for the Oxy-Fuel Flame," Welding Journal, 1959 pp. 870–875.

DONALL H. SYLVESTER, *Primary Examiner.*

G. R. MYERS, *Assistant Examiner.*